United States Patent
Hu et al.

(10) Patent No.: US 9,983,685 B2
(45) Date of Patent: *May 29, 2018

(54) ELECTRONIC APPARATUSES AND METHODS FOR PROVIDING A MAN-MACHINE INTERFACE (MMI)

(71) Applicant: MEDIATEK INC., Hsin-Chu (TW)

(72) Inventors: Yueh-Wei Hu, Taipei (TW); Cheng-Che Chen, New Taipei (TW); Ting Chiou, Hsinchu (TW); Yu-Pao Tsai, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/365,342

(22) Filed: Nov. 30, 2016

(65) Prior Publication Data
US 2017/0083105 A1  Mar. 23, 2017

Related U.S. Application Data

(63) Continuation-in-part of application No. 14/156,010, filed on Jan. 15, 2014, now Pat. No. 9,632,626, which
(Continued)

(51) Int. Cl.
G06F 3/01 (2006.01)
G06T 7/00 (2017.01)
(Continued)

(52) U.S. Cl.
CPC ............ *G06F 3/017* (2013.01); *G06F 3/0346* (2013.01); *G06K 9/00389* (2013.01);
(Continued)

(58) Field of Classification Search
CPC ...... G06F 3/0346; G06F 3/0488; G06F 3/017; G06F 3/0425; G06T 7/593;
(Continued)

(56) References Cited

U.S. PATENT DOCUMENTS

| 4,375,674 A | 3/1983 | Thornton |
| 5,365,069 A | 11/1994 | Eisen et al. |

(Continued)

FOREIGN PATENT DOCUMENTS

| CN | 1260652 | 7/2000 |
| CN | 1432969 | 7/2003 |

(Continued)

OTHER PUBLICATIONS

Fukushima et al, Real-time free viewpoint image rendering by using fast multi-pass dynamic programming, 2010.*

(Continued)

*Primary Examiner* — Shan E Elahi
(74) *Attorney, Agent, or Firm* — McClure, Qualey & Rodack, LLP

(57) ABSTRACT

An electronic apparatus includes at least two camera devices and a processing device. The processing device determines a first distance to a surface formed by the two camera devices and a second distance to the surface in response to detecting an object positioned at a first time by the two camera devices, and determines a third distance from the object positioned at a second time to the surface, wherein the second time is later than the first time, and the third distance is longer than the first distance and shorter than the second distance. Also, the processing device determines a depth in a virtual space corresponding to the object positioned at the second time according to the first distance, the second distance, and the third distance.

16 Claims, 13 Drawing Sheets

Related U.S. Application Data is a continuation of application No. 13/007,791, filed on Jan. 17, 2011, now Pat. No. 8,670,023.

(51) Int. Cl.
*G06F 3/0346* (2013.01)
*G06T 7/593* (2017.01)
*G06K 9/00* (2006.01)

(52) U.S. Cl.
CPC .......... *G06T 7/593* (2017.01); *G06K 2209/40* (2013.01); *G06T 2207/10028* (2013.01); *G06T 2207/30196* (2013.01)

(58) Field of Classification Search
CPC ......... G06T 2207/30196; G06T 7/0075; G06T 2207/10028
USPC .......................................................... 348/47
See application file for complete search history.

(56) References Cited

U.S. PATENT DOCUMENTS

| | | | |
|---|---|---|---|
| 6,057,878 A | | 5/2000 | Ogiwara et al. |
| 6,278,702 B1 | | 8/2001 | Deane et al. |
| 6,396,499 B1 | | 5/2002 | Murayama |
| 6,584,219 B1 | | 6/2003 | Yamashita et al. |
| 7,006,881 B1 | | 2/2006 | Hoffberg et al. |
| 7,079,174 B2 | | 7/2006 | Taniguchi et al. |
| 7,254,264 B2 | | 8/2007 | Naske |
| 8,289,375 B2 | | 10/2012 | Chen et al. |
| 8,340,422 B2 | | 12/2012 | Boughorbel |
| 8,400,496 B2 | | 3/2013 | Robinson |
| 8,520,020 B2 | | 8/2013 | Tin |
| 8,665,259 B2 | | 3/2014 | McCrae et al. |
| 8,670,023 B2 * | | 3/2014 | Hu ........................ G06F 3/0346 348/47 |
| 8,988,499 B2 * | | 3/2015 | Noda ...................... G06F 3/017 348/43 |
| 9,096,920 B1 * | | 8/2015 | Gomez .................... C23C 4/06 |
| 9,183,676 B2 * | | 11/2015 | McCulloch ........... G06T 19/006 |
| 9,292,085 B2 * | | 3/2016 | Bennett .................. G06F 3/012 |
| 9,459,454 B1 * | | 10/2016 | The ....................... G02B 27/017 |
| 9,600,721 B2 * | | 3/2017 | Gomez .................... C23C 4/06 |
| 9,632,626 B2 * | | 4/2017 | Hu ........................ G06F 3/0346 |
| 2001/0005204 A1 | | 6/2001 | Matsumoto et al. |
| 2002/0154215 A1 | | 10/2002 | Schechterman et al. |
| 2004/0004646 A1 | | 1/2004 | Jung et al. |
| 2005/0039176 A1 | | 2/2005 | Fournie |
| 2005/0219239 A1 * | | 10/2005 | Mashitani .......... H04N 13/0003 345/419 |
| 2006/0120706 A1 | | 6/2006 | Cho et al. |
| 2006/0158730 A1 | | 7/2006 | Kira |
| 2006/0209439 A1 | | 9/2006 | Cho et al. |
| 2007/0030342 A1 | | 2/2007 | Wilburn et al. |
| 2007/0098250 A1 | | 5/2007 | Molgaard et al. |
| 2007/0153117 A1 | | 7/2007 | Lin et al. |
| 2007/0168413 A1 | | 7/2007 | Barletta et al. |
| 2007/0237404 A1 | | 10/2007 | Strom |
| 2007/0279415 A1 | | 12/2007 | Sullivan et al. |
| 2007/0285554 A1 | | 12/2007 | Givon |
| 2008/0055400 A1 | | 3/2008 | Schechterman et al. |
| 2008/0062257 A1 | | 3/2008 | Corson |
| 2008/0158343 A1 | | 7/2008 | Schechterman et al. |
| 2008/0198159 A1 | | 8/2008 | Liu et al. |
| 2008/0198195 A1 | | 8/2008 | Matsumura |
| 2009/0111511 A1 * | | 4/2009 | Bengtsson ........ H04M 1/72519 455/556.1 |
| 2009/0160931 A1 * | | 6/2009 | Pocket ............... H04N 13/0018 348/42 |
| 2009/0183125 A1 | | 7/2009 | Magal et al. |
| 2009/0196492 A1 | | 8/2009 | Jung et al. |
| 2010/0039502 A1 | | 2/2010 | Robinson |
| 2010/0091093 A1 | | 4/2010 | Robinson |
| 2011/0063419 A1 | | 3/2011 | Lee et al. |
| 2011/0074770 A1 | | 3/2011 | Robinson et al. |
| 2011/0267264 A1 | | 11/2011 | McCarthy et al. |
| 2011/0304618 A1 * | | 12/2011 | Chen ................. H04N 13/0022 345/420 |
| 2011/0304699 A1 * | | 12/2011 | Ito ...................... H04N 13/0014 348/47 |
| 2012/0105574 A1 | | 5/2012 | Baker et al. |
| 2013/0021288 A1 | | 1/2013 | Karkkainen et al. |
| 2013/0286004 A1 * | | 10/2013 | McCulloch ........... G06T 19/006 345/419 |
| 2014/0002444 A1 * | | 1/2014 | Bennett .................. G06F 3/012 345/419 |

FOREIGN PATENT DOCUMENTS

| | | |
|---|---|---|
| CN | 101281422 | 10/2008 |
| CN | 101650624 | 2/2010 |
| EP | 1 321 894 | 6/2003 |
| KR | 100820639 B1 | 4/2008 |
| TW | 561423 | 11/2003 |
| WO | WO 2004/097612 A2 | 11/2004 |

OTHER PUBLICATIONS

Kim et al, 3D Reconstruction of stereo Images for interaction between real and virtual worlds, 2003.*

* cited by examiner

ELECTRONIC APPARATUSES AND METHODS FOR PROVIDING A MAN-MACHINE INTERFACE (MMI)

CROSS REFERENCE TO RELATED APPLICATIONS

This is a continuation-in-part application of U.S. application Ser. No. 14/156,010, filed on Jan. 15, 2014, now U.S. Pat. No. 9,632,626, which is a continuation application of U.S. application Ser. No. 13/007,791 (now U.S. Pat. No. 8,670,023, issued on Mar. 11, 2014), filed on Jan. 17, 2011, the entirety of which is incorporated by reference herein.

BACKGROUND OF THE INVENTION

Field of the Invention

The invention generally relates to a Man-Machine Interface (MMI), and more particularly, to electronic apparatuses and methods for providing an MMI in which user operations in real space are corresponding to operations in virtual space.

Description of the Related Art

To an increasing extent, display screens are being used for electronic apparatuses, such as panel PCs, mobile phones, multimedia players, portable gaming consoles, etc. A Man-Machine Interface (MMI) may be a graphical interface displayed on a display screen and a user may interact with an electronic apparatus via certain hardware input units coupled thereto or therein, such as a touch pad, keyboard, mouse, etc. Alternatively, a display screen may be incorporated with touch sensors for detecting contacts of objects on the display screen, so that users may interact with the electronic apparatus by using pointers, styluses, fingers, etc., to manipulate the MMI on the display screen.

However, most MMIs employed with either hardware input units or touch sensors are provided as two-dimensional (2D) operation interfaces. Since more and more applications are requiring 3D user operations, it is therefore desirable to have an MMI which is capable of providing flexible 3D user operations with efficient calibrations.

BRIEF SUMMARY OF THE INVENTION

In one aspect of the invention, an electronic apparatus comprising at least two camera devices and a processing device is provided. The processing device determines a first distance to a surface formed by the two camera devices and a second distance to the surface in response to detecting an object positioned at a first time by the two camera devices, and determines a third distance from the object positioned at a second time to the surface, wherein the second time is later than the first time, and the third distance is longer than the first distance and shorter than the second distance. Also, the processing device determines a depth in a virtual space corresponding to the object positioned at the second time according to the first distance, the second distance, and the third distance.

In another aspect of the invention, a method for use in an electronic apparatus comprising at least two camera devices is provided. The method comprises the steps of: determining a first distance to a surface formed by the two camera devices and a second distance to the surface in response to detecting an object positioned at a first time by the two camera devices; determining a third distance from the object positioned at a second time to the surface, wherein the second time is later than the first time, and the third distance is longer than the first distance and shorter than the second distance; and determining a depth in a virtual space corresponding to the object positioned at the second time according to the first distance, the second distance, and the third distance.

Other aspects and features of the present invention will become apparent to those with ordinarily skill in the art upon review of the following descriptions of specific embodiments of the electronic apparatuses and methods for providing an MMI.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
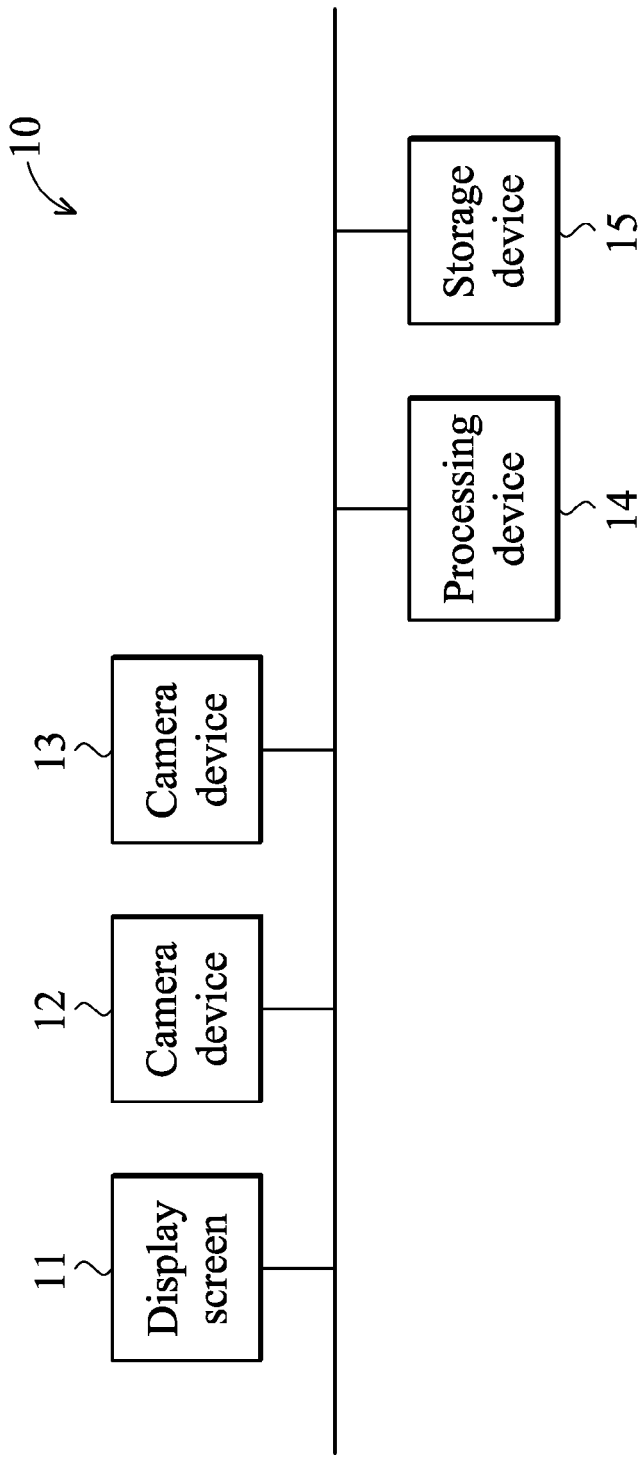
FIG. 1 shows a block diagram of an electronic apparatus according to an embodiment of the invention.

FIG. 1 shows a block diagram of an electronic apparatus according to an embodiment of the invention. The electronic apparatus 10 comprises a display screen 11, two camera devices 12 and 13, a processing device 14, and a storage device 15, wherein the display screen 11 and the camera devices 12 and 13 may serve as part of a Man-Machine Interface (MMI). The MMI is the means by which a user may interact with the electronic apparatus 10. Specifically, the MMI may contain screen menus, icons, text messages, objects, etc., displayed on the display screen 11, and the camera devices 12 and 13 are used to capture images of objects, such as the fingers, hands/palms, and/or face of the user (which may be referred to as gestures of the user), which are positioned in front thereof. The processing device 14 may be a general-purpose processor, a Micro Control Unit (MCU), a Digital Signal Processor (DSP), or another, which loads and executes a series of instruction sets and/or program code from the storage device 15, to provide the user with 3D MMI functions. The storage device 15 may be a memory, such as a FLASH memory or a Non-volatile Random Access Memory (NVRAM), or a magnetic storage device, such as a hard disk or a magnetic tape, or an optical disc, or any combination thereof. The electronic apparatus 10 may be a panel PC, a mobile phone, a smart TV, a monitor of a desktop computer or a workstation, a laptop, a Portable Media Player (PMP), a portable gaming console, a Global Positioning System (GPS) navigation device, and so on.

Although not shown, each of the camera devices 12 and 13 may include camera lens, an image sensor chip, a front-end signal processor, an image signal processor, and a frame buffer. Specifically, the camera device 12 or 13 records color images through the camera lens as intensities of red, green, and blue lights, which are stored as variable charges on the image sensor chip, such as a Complementary Metal-Oxide Semiconductor (CMOS) or a Charge-Coupled Device (CCD) image sensor chip. The charges, which are actually analog, are converted to digital signals by the front end signal processor. The image signal processor may generate an original Bayer pattern image based on the converted digital signals. Each pixel of a Bayer pattern contains information that is relative to only one color component, such as B or R. A color interpolation unit installed in the image signal processor may interpolate the Bayer pattern image to get a complete color image, RGB bitmap image. The RGB bitmap image may record an object such as a hand, a pen or the like. Each pixel of the resulting RGB bitmap image contains information that is relative to three color components, such as B and R. The RGB bitmap image may be further processed by a gamma correction unit installed in the image signal processor to perform a gamma correction process therewith and to generate a corrected RGB bitmap image, which may further be transformed into an YCbCr bitmap image by an RGB to YCbCr transform unit installed in the image signal processor. The RGB or YCbCr bitmap images may be stored in the frame buffer for subsequent analysis. Note that in some embodiments, only R or Y components of each RGB or YCbCr bitmap image are stored to increase performance analysis and reduce storage capacity.

The display screen 11 may provide a visual presentation of a virtual space generated by an MMI control module (not shown), and the camera devices 12 and 13 are disposed to form a surface, wherein the images of the gesture of the user captured by the camera devices 12 and 13 may be used to determine a 2D position corresponding to the surface, and particularly, to determine a distance from the gesture to the surface. According to the determined distance, the gesture may be further mapped to a specific depth in the virtual space.

However, different users may have different gesture traits. For example, the moving range of the gesture may vary since a taller user generally has a longer arm length than a shorter user, and the user operations concerning the depth in the virtual space is particularly limited by the moving range of the gesture. In order to adapt the MMI to the gesture traits of an individual user, a calibration procedure is performed at the start of the MMI control module. The MMI control module may be a firmware or a software module, or a combination thereof, which is executed by the processing device 14 in cooperation with the display screen 11 and the camera devices 12 and 13.

Figure 2:
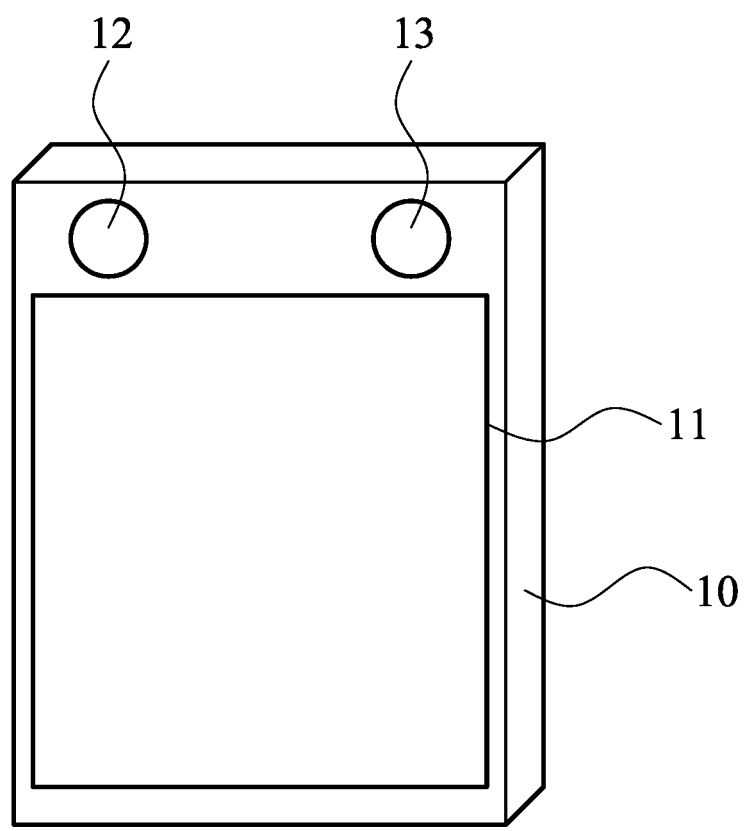
FIG. 2 is a schematic diagram illustrating an elevation view of the electronic apparatus 10 according to an embodiment of the invention.

FIG. 2 is a schematic diagram illustrating an elevation view of the electronic apparatus 10 according to an embodiment of the invention. As shown in FIG. 2. The surface formed by the disposal of the camera devices 12 and 13 conforms to the surface of the display screen 11, and the display screen 11 may display a virtual space. For example, the virtual space may be a virtual 3D room in which a plurality of objects, such as a radio, a carpet, a stereo, a TV set, and a bookshelf, are placed, or may be an email box in which a plurality of emails are listed from top to bottom, or may be a console for demonstrating a 3D figure of a doll. To calibrate the gesture traits of a user to fit the manipulation of the virtual space, a proper range of user operations in depth of the real space is determined to correspond to the total depth in the virtual space (as will be illustrated in the following FIGS. 3 to 5). After the calibration procedure performed at a first time, the position of the user's gesture in the real space at a second time may be mapped to the virtual space (as will be illustrated in the following FIGS. 8A, 8B, and 10), wherein the second time is later than the first time.

Figure 3:
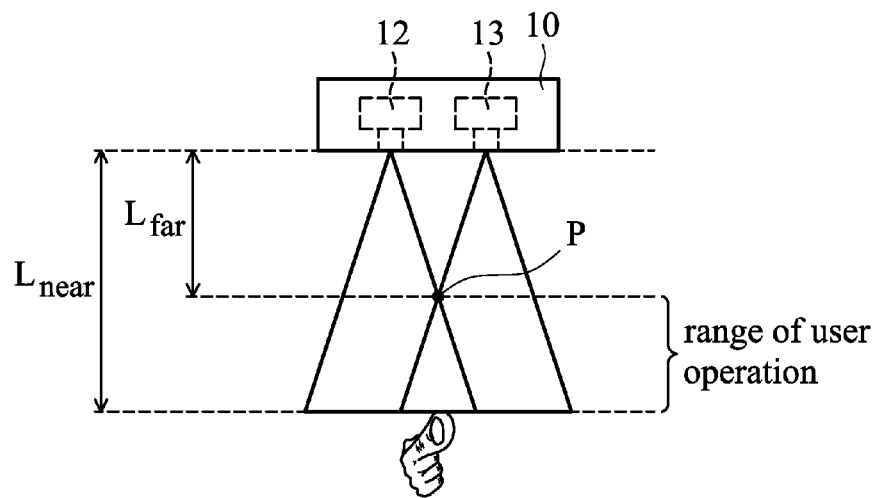
FIG. 3 is a top view illustrating the determination of the proper range of user operations in depth of the real space according to an embodiment of the invention.

FIG. 3 is a top view illustrating the determination of the proper range of user operations in depth of the real space according to an embodiment of the invention. As shown in FIG. 3, a user's gesture is required to indicate the nearest end of the virtual space, and the point to indicate the farthest end of the virtual space is automatically determined to be the cross point (denoted as P) of the ranges of views of the camera devices 12 and 13. The cross point is determined according to the configuration of the camera devices 12 and 13. Specifically, the distance from the cross point to the surface formed by the camera devices 12 and 13 (denoted as $L_{far}$) is determined by the angles of views of the camera devices 12 and 13, and the distance between the camera devices 12 and 13. In another embodiment, the point to indicate the farthest end of the virtual space may be set to a position further away from the cross point and the surface, and accordingly, the distance $L_{far}$ is prolonged to accommodate the user with shorter arm length. The distance from the user's gesture to the surface formed by the camera devices 12 and 13 (denoted as $L_{near}$) is determined according to the distance between the camera devices 12 and 13, and the distance between the user's gestures in the two images captured by the camera devices 12 and 13. Thus, the proper range of user operations in depth of the real space falls within the distances $L_{far}$ and $L_{near}$.

Figure 4:
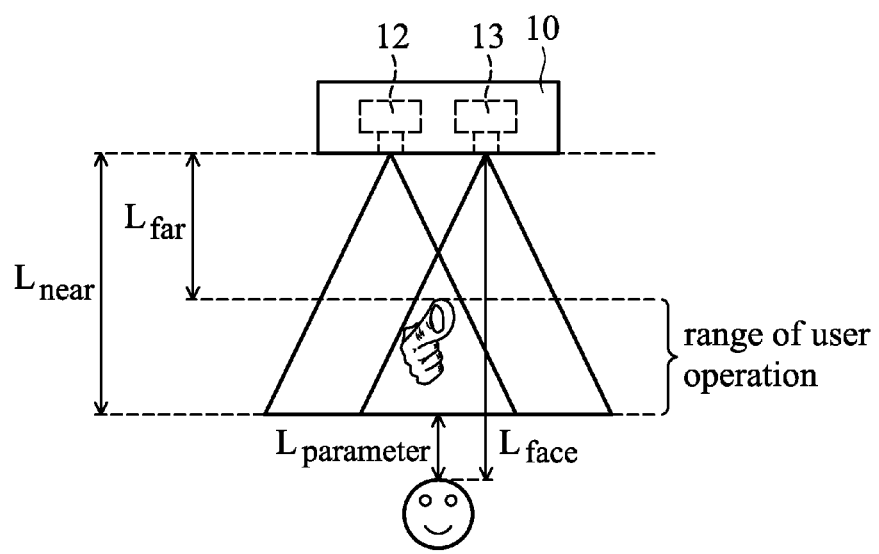
FIG. 4 is a top view illustrating the determination of the proper range of user operations in depth of the real space according to another embodiment of the invention.

FIG. 4 is a top view illustrating the determination of the proper range of user operations in depth of the real space according to another embodiment of the invention. As shown in FIG. 4, a user's gesture is required to indicate the farthest end of the virtual space, and the point to indicate the nearest end of the virtual space is automatically determined according to the distance from the user's face (or a specific part of the user's body) to the surface formed by the camera devices 12 and 13 (denoted as $L_{face}$). Specifically, the distance from the point to the surface formed by the camera devices 12 and 13 (denoted as $L_{near}$) is determined by subtracting a predetermined length (denoted as $L_{parameter}$) from the distance $L_{face}$, wherein the predetermined length $L_{parameter}$ represents a distance from the user's face to render comforts for conducting the user's gesture. The predetermined length $L_{parameter}$ may be set by the user, or set according to the size of the user's face. Alternatively, a number of experiments may be run on different users to collect statistics for determining a suitable value for the predetermined length $L_{parameter}$. The distance from the user's gesture to the surface formed by the camera devices 12 and 13 (denoted as $L_{far}$) is determined according to the distance between the camera devices 12 and 13, and the distance between the user's gestures in the two images captured by the camera devices 12 and 13. Thus, the proper range of user operations in depth of the real space falls within the distances $L_{far}$ and $L_{near}$.

Figure 5:
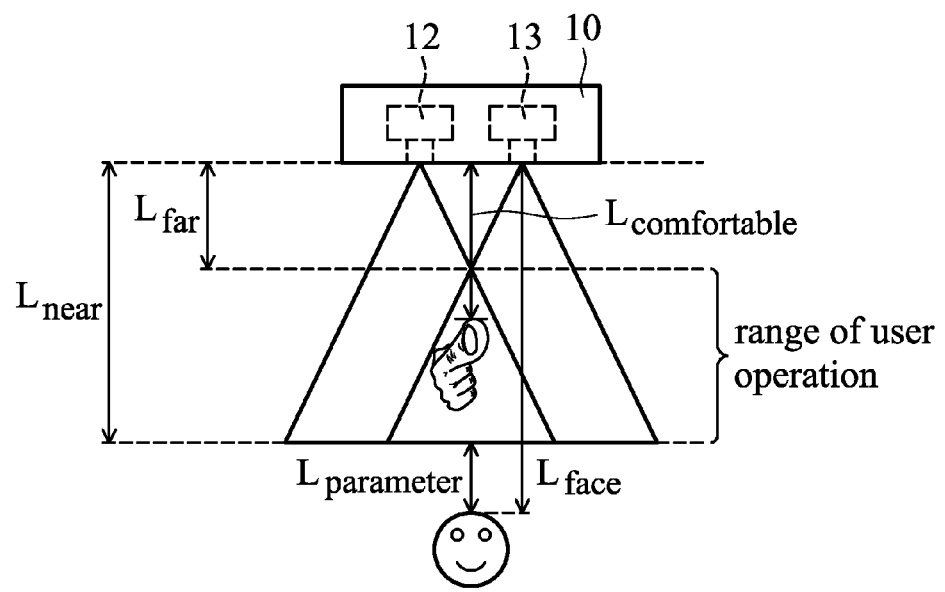
FIG. 5 is a top view illustrating the determination of the proper range of user operations in depth of the real space according to still another embodiment of the invention.

FIG. 5 is a top view illustrating the determination of the proper range of user operations in depth of the real space according to still another embodiment of the invention. Similar to FIG. 3, the point to indicate the farthest end of the virtual space is automatically determined to be the cross point (denoted as P) of the ranges of views of the camera devices 12 and 13, wherein the cross point is determined according to the configuration of the camera devices 12 and 13. Specifically, the distance from the cross point to the surface formed by the camera devices 12 and 13 (denoted as $L_{far}$) is determined by the angles of views of the camera devices 12 and 13, and the distance between the camera devices 12 and 13. Similar to FIG. 4, the point to indicate the nearest end of the virtual space is automatically determined according to the distance from the user's face (or a specific part of the user's body) to the surface formed by the camera devices 12 and 13. Specifically, the distance from the point to the surface formed by the camera devices 12 and 13 (denoted as $L_{near}$) is determined by subtracting a predetermined length (denoted as $L_{parameter}$) from the distance $L_{face}$, wherein the predetermined length $L_{parameter}$ represents a comfortable distance from the user's face for conducting the user's gesture. As shown in FIG. 5, a user's gesture is required to indicate the middle of the farthest end and nearest end of the virtual space, and the distance from the user's gesture to the surface formed by the camera devices 12 and 13 (denoted as $L_{comfortable}$) is determined according to the distance between the camera devices 12 and 13, and the distance between the user's gestures in the two images captured by the camera devices 12 and 13. Thus, the proper range of user operations in depth of the real space falls within the distances $L_{far}$ and $L_{near}$.

Figure 6:
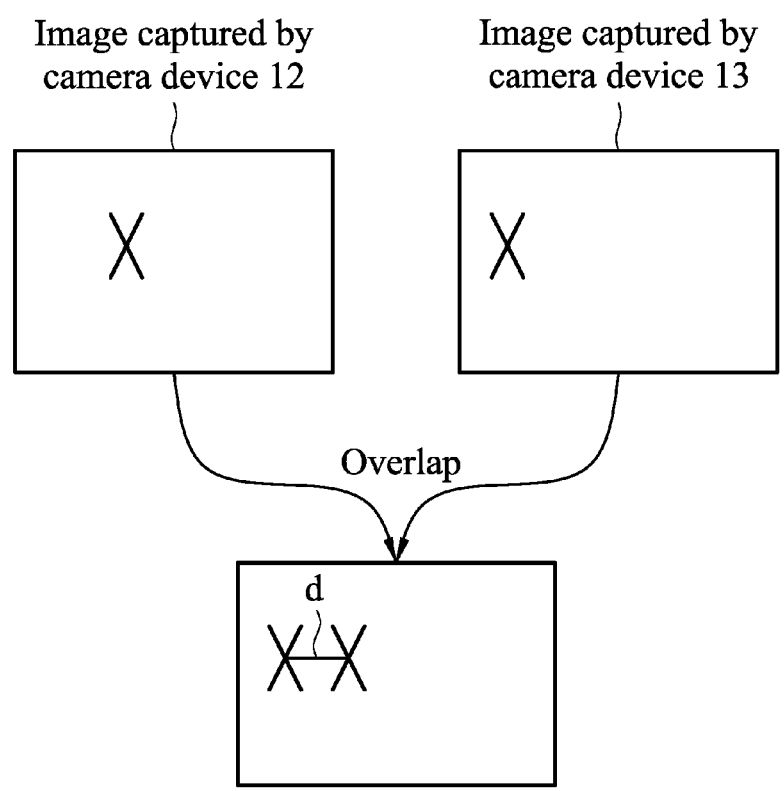
FIG. 6 is an exemplary diagram illustrating the difference between the positions of an object in the images captured by the camera devices 12 and 13.

During the determinations of the distance $L_{near}$ in FIG. 3, the distance $L_{far}$ in FIG. 4, and the distance $L_{comfortable}$ in FIG. 5, the camera devices 12 and 13 are required to capture images in front of the display screen 11. Assuming that the camera devices 12 and 13 are disposed in different positions at a substantial distance D, the position of the user's gesture in an image captured by the camera device 12 will be different from the position of the user's gesture in the other image captured by the camera device 13. By overlapping the two images, the difference d between the positions of the user's gesture in the two images may be determined, as shown in FIG. 6. That is, the distance $L_{near}$ in FIG. 3, the distance $L_{far}$ in FIG. 4, and the distance $L_{comfortable}$ in FIG. 5 may be determined according to the distance D and the difference d.

Figure 7:
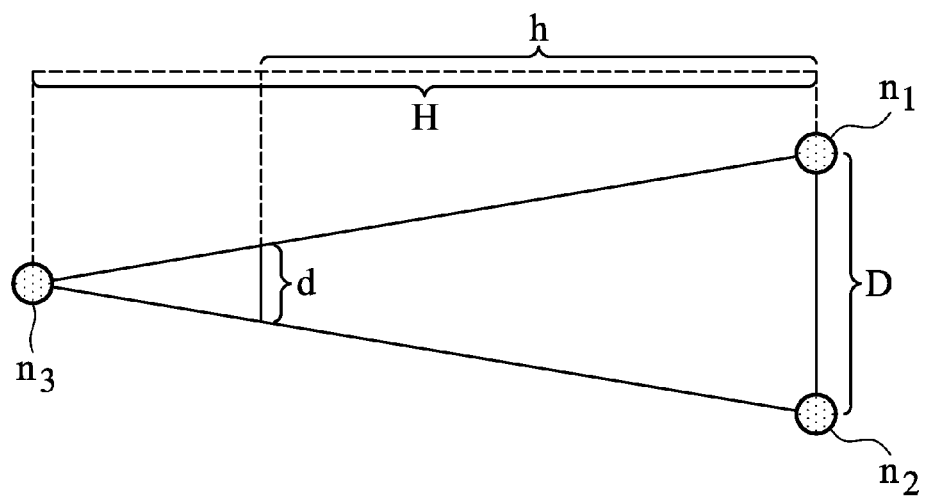
FIG. 7 shows an exemplary diagram of a triangle established in the stereo depth calculation according to an embodiment of the invention.

In one embodiment, the determinations of the distance $L_{near}$ in FIG. 3, the distance $L_{far}$ in FIG. 4, and the distance $L_{comfortable}$ in FIG. 5 may be performed using the stereo depth calculation in which a triangle is established to determine the distance from the user's gesture to the surface of the display screen 11 with reference to the distance D and difference d. FIG. 7 shows an exemplary diagram of a triangle established in the stereo depth calculation according to an embodiment of the invention. The triangle consists of three nodes $n_1$ to $n_3$, wherein nodes $n_1$ and $n_2$ correspond to the positions of the camera devices 12 and 13. When an object is placed at node $n_3$ and captured by the camera devices 12 and 13, the positions of the object in two captured images are substantially the same. Note that the distance H between node $n_3$ and the surface formed by the camera devices 12 and 13 is a constant that is predetermined or known during the manufacturing and fabrication processes of the electronic apparatus 10. With the distance H, the distance D, and the difference d, the distance from the user's gesture to the surface formed by the camera devices 12 and 13 (denoted as h) may be determined by employing the following normalized cross correlation technique:

$$h = \left(1 - \frac{d}{D}\right) \times H \quad (1)$$

In another embodiment, the determinations of the distance $L_{near}$ in FIG. 3, the distance $L_{far}$ in FIG. 4, and the distance $L_{comfortable}$ in FIG. 5 may be performed using a lookup table which stores mapping information between a plurality of predetermined distances $L_p$ to the surface formed by the camera devices 12 and 13, and a plurality of differences $d_c$ between the positions of an object in two images captured by the camera devices 12 and 13. The mappings are predetermined during the manufacturing and fabrication processes of the electronic apparatus 10. An exemplary lookup table is given below in Table 1:

TABLE 1

| Predetermined distance $L_p$ (pixel) | Corresponding difference $d_c$ (pixel) |
|---|---|
| 50 | 10 |
| 60 | 12 |
| 80 | 14 |
| . | . |
| . | . |
| . | . |

With the lookup table, the processing device 14 first determines the difference between the positions of an object in two images captured by the camera devices 12 and 13, and then searches the lookup table for a match for the determined difference d. If a match is found, the processing device 14 obtains the corresponding distance in accordance with the match. Otherwise, if no match is found, the processing device 14 locates two stored differences d' and d" in which the determined difference d falls between, and their corresponding predetermined distances L' and L", wherein d" is greater than d' and L" is greater than L'. Next, the processing device 14 calculates the distance between the object and the surface formed by the camera devices 12 and 13 using the following equal proportional correlation technique:

$$\left(\frac{d-d'}{d''-d'}\right) \times (L'' - L') + L' \quad (3)$$

For example, if the determined difference d at a given time is 11 pixels, the distance from the object to the surface formed by the camera devices 12 and 13 may be determined to be $$\left(\frac{11-10}{12-10}\right) \times (60 - 50) + 50$$

pixels. It should be understood that the unit for measuring the difference between the position of an object in two images captured by the camera devices 12 and 13, and the distance from the object to the surface formed by the camera devices 12 and 13 may alternatively be in inches, centimeters, millimeters, or the like, and the invention is not limited thereto.

In yet another embodiment, the determinations of the distance $L_{near}$ in FIG. 3, the distance $L_{far}$ in FIG. 4, and the distance $L_{comfortable}$ in FIG. 5 may be performed using a combination of the stereo depth calculation and the lookup table. The processing device 14 first determines the difference between the positions of an object in two images captured by the camera devices 12 and 13, and then searches for a match for the determined difference d in the lookup table to obtain the corresponding distance. If no match is found, the processing device 14 uses the stereo depth calculation technique, instead of the equal proportional correlation technique, to determine the corresponding distance.

Figure 8A:
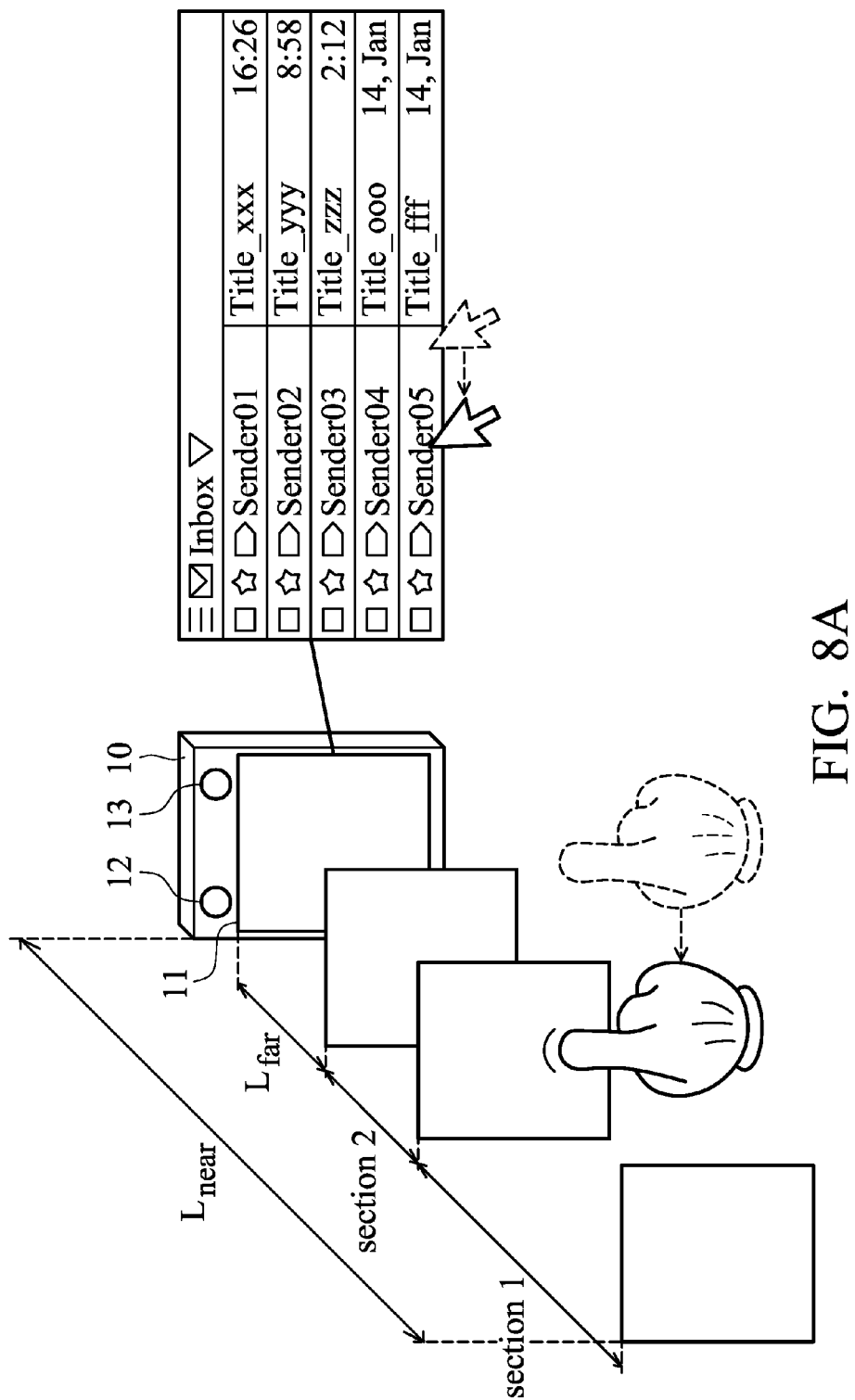
FIGS. 8A and 8B show an exemplary diagram illustrating the manipulation of an email box displayed on the display screen 11 according to an embodiment of the invention.
Figure 8B:
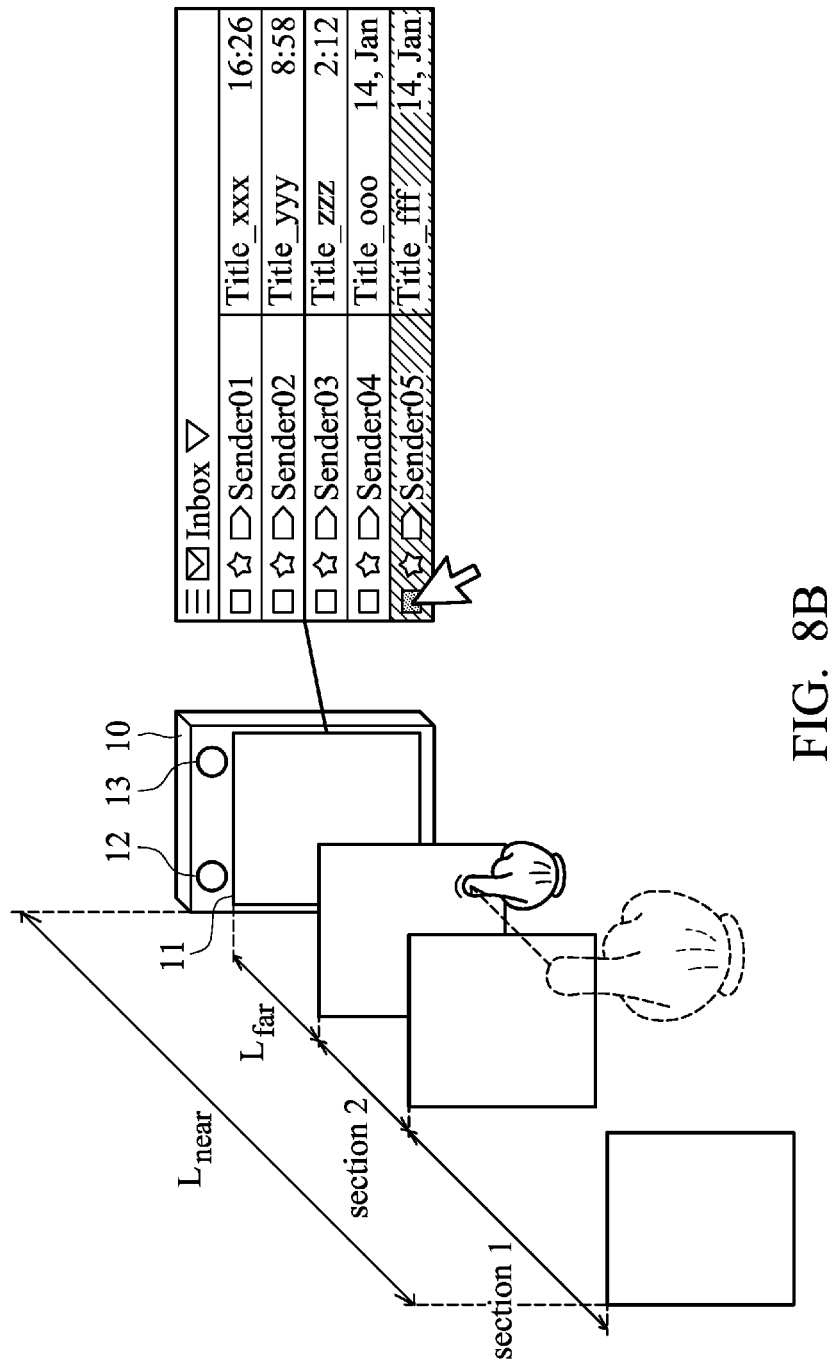

FIGS. 8A and 8B show an exemplary diagram illustrating the manipulation of an email box displayed on the display screen 11 according to an embodiment of the invention. In this embodiment, the virtual space displayed on the display screen 11 is an email box in which a plurality of emails are listed from top to bottom, and a check box, a star sign, and a label sign are associated with each one of the emails. In addition to the email box, a cursor is displayed on the display screen 11 to correspond to the user's gesture in the real space. It should be noted that, although the presentation of the email box is two-dimensional (2D), the actions, such as a single click or double click, of the cursor may be referred to as the third-dimensional information (e.g., depth) of the 2D email box. That is, the depth information of the user's gesture corresponds to a certain action of the cursor (i.e., the third-dimensional information of the virtual space).

As shown in FIG. 8A, the moving of the user's gesture on any plane that is parallel to the surface formed by the camera devices 12 and 13 corresponds to the moving of the cursor.

As shown in FIG. 8B, the length of user's operational range from the distance $L_{near}$ to the distance $L_{far}$ is divided into two sections, wherein the moving of the user's gesture in the depth direction (i.e., the direction to or from the surface formed by the camera devices 12 and 13) within the first section corresponds to no action of the cursor, and the moving of the user's gesture in the depth direction within the second section corresponds to a click of the cursor (denoted as clicking on the check box of the fifth email from the top to select the email for further editing). It should be understood that the length of the user's operational range may be divided into more than two sections to correspond to more than two actions of the cursor, and the invention is not limited thereto.

Figure 9:
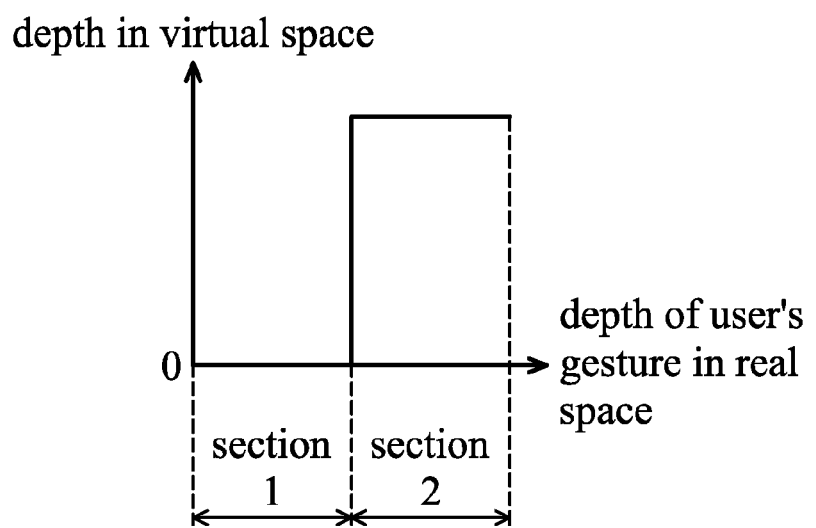
FIG. 9 is a diagram illustrating the mapping of the depth information of the user's gesture in the real space to the third dimensional information of the virtual space according to the embodiment of FIGS. 8A and 8B.

FIG. 9 is a diagram illustrating the mapping of the depth information of the user's gesture in the real space to the third dimensional information of the virtual space according to the embodiment of FIGS. 8A and 8B. As shown in FIG. 9, there are only two depth values for the virtual space, each of which corresponds to a section of depth in the real space. In one embodiment, a quantized-segment lookup table may be used to store the mapping. An exemplary quantized-segment lookup table is given below in Table 2:

TABLE 2

| Depth in real space (millimeter) | Depth in virtual space (millimeter) |
|---|---|
| 0~30 | 0 (indicates no action of the cursor) |
| 31~40 | 1 (indicates a click of the cursor) |

With the quantized-segment lookup table, after the depth of the user's gesture in the real space is determined, the corresponding depth in the virtual space may be obtained by consulting the table.

Figure 10:
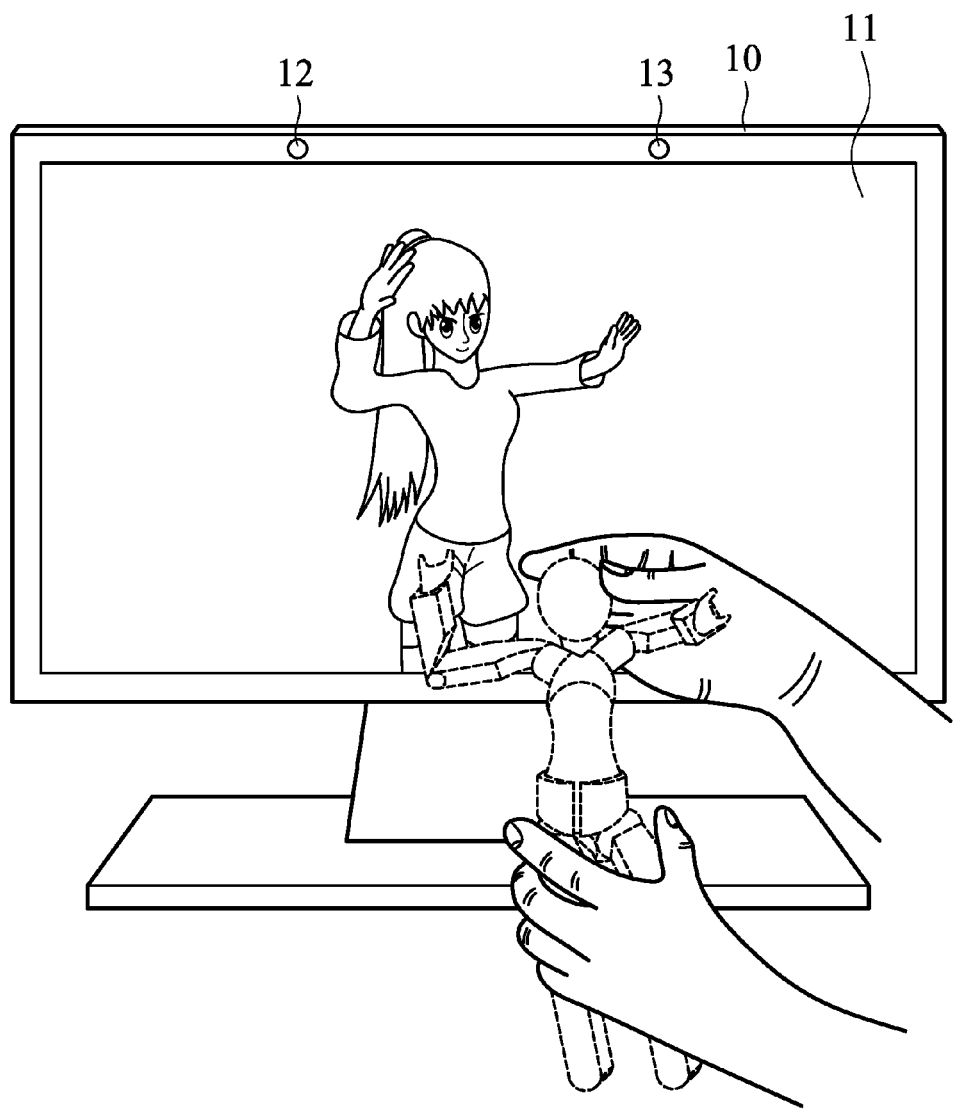
FIG. 10 is an exemplary diagram illustrating the manipulation of an interactive 3D modeling console displayed on the display screen 11 according to an embodiment of the invention.

FIG. 10 is an exemplary diagram illustrating the manipulation of an interactive 3D modeling console displayed on the display screen 11 according to an embodiment of the invention. In this embodiment, the virtual space displayed on the display screen 11 is an interactive 3D modeling console, in which a virtual 3D model is displayed with a set of functional icons for various adjustments of the virtual 3D model. The motion of the user's gesture (assuming the right hand of the user is the dominant hand for manipulation of the virtual space) on any plane that is parallel to the surface formed by the camera devices 12 and 13 corresponds to the motion of a certain part of the virtual 3D model in the 2D directions (denoted as the head of the virtual 3D model upon which the dominant hand of the user is placed). The motion of the user's gesture in the depth direction corresponds to the motion of a certain part of the virtual 3D model in the depth direction.

Figure 11:
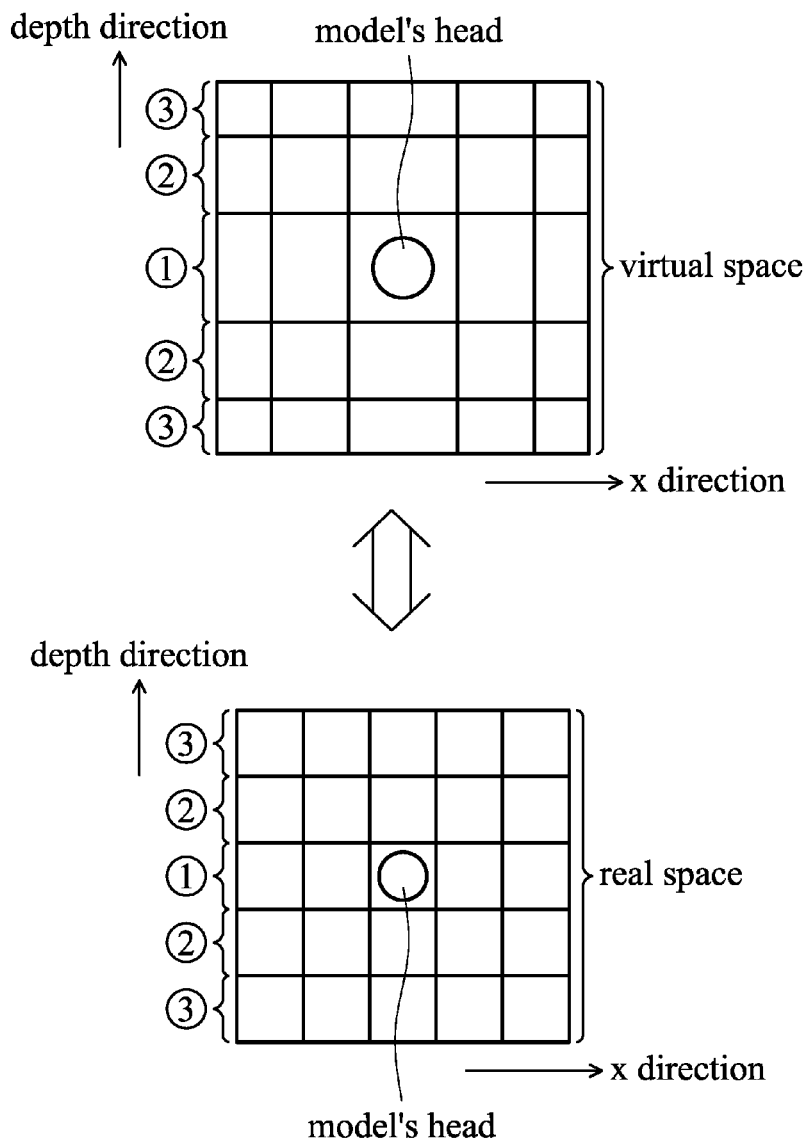
FIG. 11 is a top view illustrating the mapping of the real space to the virtual space.
Figure 12:
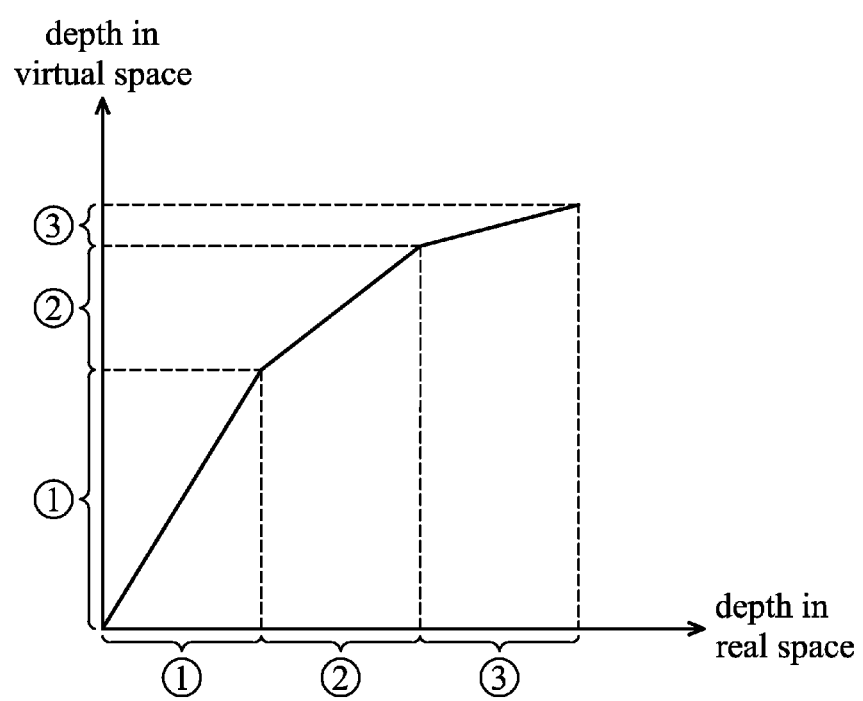
FIG. 12 is a diagram illustrating piece-wise linear relation between the user's gesture in the real space and the part of the virtual 3D model in the virtual space according to the embodiment of FIG. 11.

Specifically, the user's operational range either in the 2D directions or in the depth direction is divided into a plurality of sections, wherein the motion of the user's gesture in each section is in a respective linear relation with the motion of the part of the virtual 3D model in the virtual space. FIG. 11 is a top view illustrating the mapping of the real space to the virtual space. As shown in FIG. 11, the top views of the real space and the virtual space are each divided into 3 sections from the head of the virtual 3D model in either the depth direction or the x direction. Specifically, the sections of the real space are in equal size, while the sections of the virtual space in either the depth direction or the x direction are reduced in proportion to the distance from the head of the virtual 3D model, thereby enabling different scales of tuning of different parts of the virtual 3D model. Within each section, the motion of the user's gesture in the real space is linear with the motion of the part of the virtual 3D model in the virtual space. FIG. 12 is a diagram illustrating piece-wise linear relation between the user's gesture in the real space and the part of the virtual 3D model in the virtual space according to the embodiment of FIG. 11. As shown in FIG. 12, the linear relation within the section that is closer to the head has a steeper slope, which means that finer tuning is provided to the parts that are closer to the head. In one embodiment, a piece-wise linear lookup table may be used to store the mapping of the depth information the user's gesture to the depth information of the virtual space. An exemplary piece-wise linear lookup table is given below in Table 3:

TABLE 3

| Depth in real space (millimeter) | Depth in virtual space (millimeter) |
|---|---|
| 0~10 | 0~30 |
| 11~20 | 31~45 |
| 21~30 | 45~55 |

With the piece-wise linear lookup table, after the depth of the user's gesture in the real space is determined, the corresponding depth in the virtual space may be obtained by looking up the table.

Figure 13:
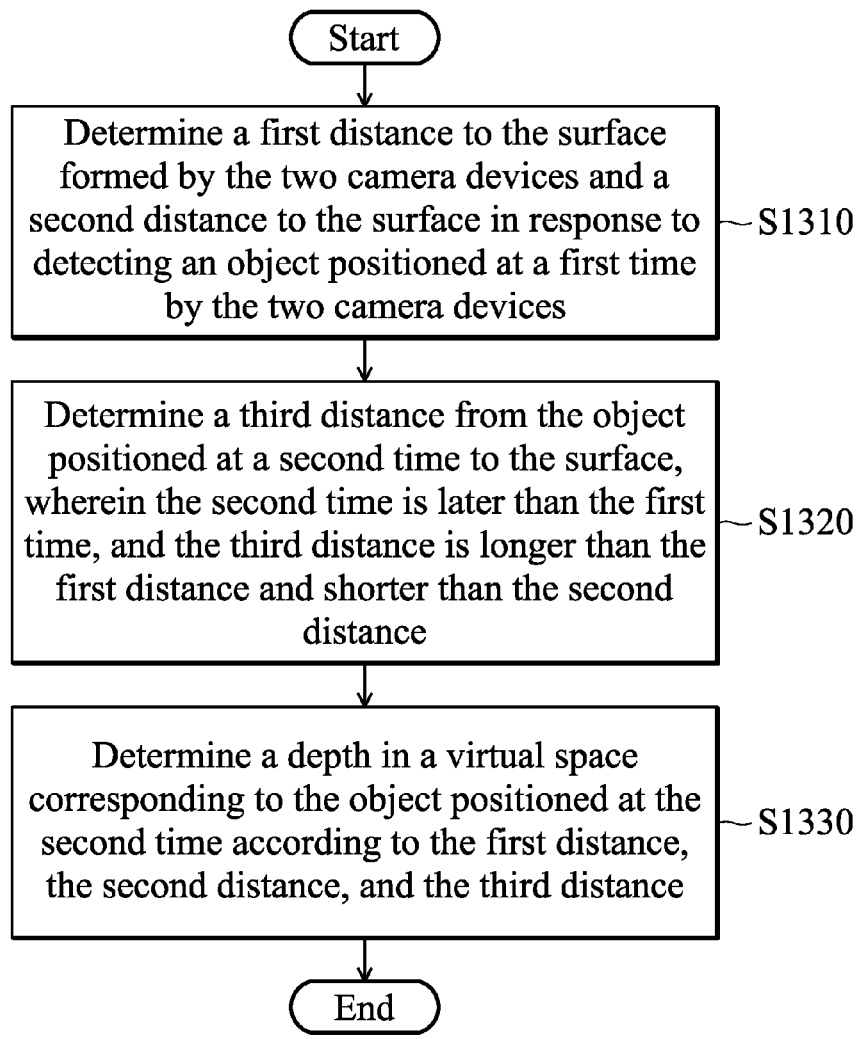
FIG. 13 is a flow chart illustrating the method for providing an MMI according to an embodiment of the invention.

FIG. 13 is a flow chart illustrating the method for providing an MMI according to an embodiment of the invention. The method may be applied in an electronic apparatus equipped with a display screen and at least two camera devices, such as a panel PC, a mobile phone, a smart TV, a monitor of a desktop computer or a workstation, a laptop, a PMP, a portable gaming console, a GPS navigation device, and so on. Using the electronic apparatus 10 as an example, when the electronic apparatus 10 is started up, a series of initialization processes, including booting up of the operating system, initializing of an MMI, and activating of the embedded or coupled functional modules (such as the display screen 11 and the camera devices 12 and 13), etc., are performed. After the initialization processes are finished, an MMI control module for providing a virtual space of the MMI is executed to carry out the method of the invention. To begin the method, a calibration procedure is performed, in which the processing device 14 determines a first distance to the surface formed by the camera devices 12 and 13, and a second distance to the surface in response to detecting an object positioned at a first time by the camera devices 12 and 13 (step S1310). Specifically, the range between the first and second distances may represent a calibrated depth of operation for the user's gesture, wherein the first and second distances correspond to the farthest end and the nearest end of the virtual space, respectively.

In a first embodiment, the first distance is automatically determined according to the distance between the camera devices 12 and 13, and the angles of views of the camera devices 12 and 13, while the second distance is determined according to the distance between the camera devices 12 and 13, and the distance between the positions of the object in the images captured by the camera devices 12 and 13 at the first time. Reference may be made to the embodiment of FIG. 3 for detailed description.

In a second embodiment, the first distance is determined according to the distance between the camera devices 12 and 13, and the distance between the positions of the object in the images captured by the camera devices 12 and 13 at the first time, while the second distance is determined by subtracting a predetermined length from the distance from the face of the user to the surface. Reference may be made to the embodiment of FIG. 4 for detailed description.

In a third embodiment, the first distance is automatically determined according to the distance between the camera devices 12 and 13, and the angles of views of the camera devices 12 and 13, while the second distance is determined by subtracting a predetermined length from the distance from the face of the user to the surface. Reference may be made to the embodiment of FIG. 5 for detailed description.

Subsequent to step S1310, during regular manipulation of the virtual space, the processing device 14 determines a third distance from the object positioned at a second time to the surface, wherein the second time is later than the first time, and the third distance is longer than the first distance and shorter than the second distance (step S1320). For detailed description of the determinations of the first, second, and third distances, reference may be made to the embodiment of FIG. 7.

After that, the processing device 14 determines a depth in the virtual space corresponding to the object positioned at the second time according to the first distance, the second distance, and the third distance (step S1330). In one embodiment, the determination of the depth in the virtual space may be performed by using the quantized-segment mapping as shown in FIG. 9. In another embodiment, the determination of the depth in the virtual space may be performed by using the piece-wise linear mapping as shown in FIG. 12.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

Note that use of ordinal terms such as "first", "second", "third", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. An electronic apparatus, comprising:
   a display device, configured to display a virtual space;
   at least two camera devices, configured to capture images of an object placed in front of the display device; and
   a processing device, configured to:
   determine a first distance and a second distance to a surface formed by the two camera devices, by processing two images of the object captured by the two camera devices at a first time, in response to detecting the object positioned at the first time by the two camera devices,
   determine a third distance from the object positioned at a second time to the surface to be a position within an operation area determined according to the first distance and the second distance, by processing two images of the object captured by the two camera devices at the second time, and
   transform the position within the operation area into a depth in the virtual space corresponding to the object positioned at the second time according to the first distance, the second distance, and the third distance,
   wherein the second time is later than the first time, and the third distance is longer than the first distance and shorter than the second distance.

2. The electronic apparatus of claim 1, wherein the two camera devices are disposed at a fourth distance from each other, and the object in one of the images captured at the first time or the second time is positioned at a fifth distance from the object in the other one of the images.

3. The electronic apparatus of claim 2, wherein the first distance is determined according to the fourth distance and a respective angle of view corresponding to each of the two camera devices, and the second distance or the third distance is determined according to the fourth distance and the corresponding fifth distance.

4. The electronic apparatus of claim 2, wherein the processing device further determines a sixth distance from a user's face positioned at the first time to the surface, and the second distance is determined by subtracting a predetermined length from the sixth distance, and the first distance, the third distance, or the sixth distance is determined according to the fourth distance and the corresponding fifth distance.

5. The electronic apparatus of claim 2, wherein the first distance is determined according to the fourth distance and a respective angle of view corresponding to each of the two camera devices, and the processing device further determines a sixth distance from a user's face positioned at the first time to the surface, and the second distance is determined by subtracting a predetermined length from the sixth distance, and the third distance or the sixth distance is determined according to the fourth distance and the corresponding fifth distance.

6. The electronic apparatus of claim 1, wherein the first distance and the second distance correspond to a farthest end and a nearest end of the virtual space, respectively.

7. The electronic apparatus of claim 6, wherein the processing device further divides a length from the second distance to the first distance into a plurality of sections, each of which corresponds to a predetermined depth in the virtual space, and determines the section where the third distance is located, and the depth equals the predetermined depth corresponding to the section.

8. The electronic apparatus of claim 6, wherein the processing device further divides a length from the second distance to the first distance into a plurality of sections and determines the section where the third distance is located, and the depth is determined using the following formula:

$$\frac{L'_{near} - L_{current}}{L'_{near} - L'_{far}} \times T_x,$$

wherein $L_{far}'$ is the farthest end of the section, $L_{near}'$ is the nearest end of the section, $L_{current}$ is the third distance, and $T_x$ represents the total length of the section.

9. A method for use in an electronic apparatus comprising at least two camera devices and a display device, the method comprising:
displaying, by the display device, a virtual space;
determining a first distance and a second distance to a surface formed by the two camera devices, by processing two images of an object captured by the two camera devices at a first time, in response to detecting the object positioned in front of the display device at the first time by the two camera devices;
determining a third distance from the object positioned at a second time to the surface to be a position within an operation area determined according to the first distance and the second distance, by processing two images of the object captured by the two camera devices at the second time, wherein the second time is later than the first time, and the third distance is longer than the first distance and shorter than the second distance; and transforming the position within the operation area into a depth in the virtual space corresponding to the object positioned at the second time according to the first distance, the second distance, and the third distance.

10. The method of claim 9,
wherein the two camera devices are disposed at a fourth distance from each other, and the object in one of the images captured at the first time or the second time is positioned at a fifth distance from the object in the other one of the images.

11. The method of claim 10, wherein the first distance is determined according to the fourth distance and a respective angle of view corresponding to each of the two camera devices, and the second distance or the third distance is determined according to the fourth distance and the corresponding fifth distance.

12. The method of claim 10, further comprising:
determining a sixth distance from a user's face positioned at the first time to the surface,
wherein the second distance is determined by subtracting a predetermined length from the sixth distance, and the first distance, the third distance, or the sixth distance is determined according to the fourth distance and the corresponding fifth distance.

13. The method of claim 10, further comprising:
determining a sixth distance from a user's face positioned at the first time to the surface,
wherein the first distance is determined according to the fourth distance and a respective angle of view corresponding to each of the two camera devices, and the second distance is determined by subtracting a predetermined length from the sixth distance, and the third distance or the sixth distance is determined according to the fourth distance and the corresponding fifth distance.

14. The method of claim 9, wherein the first distance and the second distance correspond to a farthest end and a nearest end of the virtual space, respectively.

15. The method of claim 14, further comprising:
dividing a length from the second distance to the first distance into a plurality of sections, each of which corresponds to a predetermined depth in the virtual space; and
determining the section where the third distance is located, wherein the depth equals the predetermined depth corresponding to the section.

16. The method of claim 14, further comprising:
dividing a length from the second distance to the first distance into a plurality of sections; and
determining the section where the third distance is located, and the depth is determined using the following formula:

$$\frac{L_{near} - L_{current}}{L_{near} - L_{far}} \times T$$

wherein $L_{far}'$ is the farthest end of the section, $L_{near}'$ is the nearest end of the section, $L_{current}$ is the third distance, and $T_x$ represents the total length of the section.

* * * * *